(12) United States Patent
Radovich et al.

(10) Patent No.: US 7,160,099 B2
(45) Date of Patent: Jan. 9, 2007

(54) LEAKAGE-FREE FEED ROLL ASSEMBLY FOR AN EXTRUDER MACHINE

(75) Inventors: John L. Radovich, Mystic, CT (US); Jeffrey S. Bryan, Voluntown, CT (US)

(73) Assignee: Davis-Standard, LLC, Pawcatuck, CT (US)

( * ) Notice: Subject to any disclaimer, the term of this patent is extended or adjusted under 35 U.S.C. 154(b) by 22 days.

(21) Appl. No.: 10/922,129

(22) Filed: Aug. 18, 2004

(65) Prior Publication Data

US 2005/0048157 A1    Mar. 3, 2005

Related U.S. Application Data

(60) Provisional application No. 60/499,074, filed on Sep. 2, 2003.

(51) Int. Cl.
*B29C 43/46* (2006.01)
(52) U.S. Cl. ............... 425/447; 425/207; 425/363; 366/71; 366/331
(58) Field of Classification Search ............... 425/113, 425/447, 207, 209, 145, 363; 366/71, 331
See application file for complete search history.

(56) References Cited

U.S. PATENT DOCUMENTS

| | | | |
|---|---|---|---|
| 3,147,514 A * | 9/1964 | Reilly | .......... 366/71 |
| 3,947,201 A | 3/1976 | Ellwood | |
| 4,289,410 A | 9/1981 | Anders | |
| 4,576,563 A | 3/1986 | Harada et al. | |
| 4,718,770 A * | 1/1988 | Christy | .......... 366/71 |
| 4,812,048 A | 3/1989 | Neumann et al. | |
| 4,863,366 A | 9/1989 | Kim | |
| 4,911,631 A | 3/1990 | Harada et al. | |
| 4,978,290 A | 12/1990 | Fukuhara | |
| 5,106,287 A | 4/1992 | Kurihara | |
| 5,200,204 A | 4/1993 | Horton et al. | |
| 5,267,787 A | 12/1993 | Baumgarten | |
| 5,330,342 A | 7/1994 | Linss et al. | |
| 6,805,544 B1 | 10/2004 | Kirjavainen | |
| 6,863,519 B1 | 3/2005 | Schwaiger et al. | |
| 2002/0066896 A1 | 6/2002 | Bligh et al. | |
| 2002/0123556 A1 | 9/2002 | Giammattei | |
| 2002/0124704 A1 | 9/2002 | Roth | |
| 2003/0025236 A1 | 2/2003 | Higuchi | |

FOREIGN PATENT DOCUMENTS

| | | |
|---|---|---|
| DE | 198 29 679 | 1/2000 |
| EP | 0 445 774 A | 9/1991 |
| EP | 0 767 045 A | 4/1997 |

* cited by examiner

*Primary Examiner*—Joseph S. Del Sole
(74) *Attorney, Agent, or Firm*—Levy & Grandinetti

(57) ABSTRACT

The invention relates to a feed roll assembly for reducing leakage of an elastomeric material in a feed section of an extruder machine. A shell, feed roll seal plates, and feed roll end plates are used to reduce the leakage of elastomeric material. Elastomeric material is redirected back to the feed section through the use of a varying bore diameter of the shell and grooves contained in both the feed roll seal plates and the feed roll end plates. The shell, feed roll seal plates, feed roll end plates, and a feed roll scraper are each coated with a solid, dry lubricant coating to reduce friction. The invention provides desirable feedback of overflow elastomeric material and permits a retrofitting of the feed roll assembly to existing extruder machines.

10 Claims, 5 Drawing Sheets

LEAKAGE-FREE FEED ROLL ASSEMBLY FOR AN EXTRUDER MACHINE

I claim the benefit under Title 35, United States Code, §120 to U.S. Provisional Application No. 60/499,074, filed Sep. 2, 2003, entitled a LEAKAGE-FREE FEED ROLL ASSEMBLY FOR AN EXTRUDER MACHINE.

BACKGROUND OF THE INVENTION

1. Field of the Invention

This invention relates to a leakage-free feed roll assembly for an extruder machine. Specifically, this invention relates to a feed roll assembly for reducing the leakage of elastomeric material in a feed section of an extruder machine.

2. Description of Related Art

Extruder screws employed in the softening or melting, mixing, and compounding of elastomeric material typically employ three zones, namely a feed zone, a softening or melting zone, and a metering zone. The extruder screw is typically positioned for rotation in an extruder barrel that includes a hopper or other guarding section adjacent to the feed section of the screw, and a discharge end opposite the hopper or guarding section and proximate to the metering section of the screw. A solid elastomeric material is introduced through the hopper or guarding section during operation and presented to the feed zone of the screw where it begins to soften or melt. The solid elastomeric material is then conveyed to the softening or melting zone where it softens or melts at a greater rate than in the feed zone and is ultimately converted to a molten state. The molten material is transferred from the softening or melting zone to the metering zone for conveyance to a discharge end of the extruder where the material typically passes through a shaping die.

FIG. 1 illustrates a conventional feed roll assembly in a feed section of an extruder machine. The feed section 100 of the extruder machine is encased in a housing 102 that includes a barrel (not shown) having a bore 104. The feed section 100 is generally mounted to a gear reducer and includes a hopper or guarding section adjacent thereto. An axially elongated extruder screw 106 is positioned within the bore 104 and is rotatably coupled to the gear reducer. The extruder screw 106 is divided into three zones or sections, a feed section 100 located at an inlet end of the extruder screw 106, a metering section located at an outlet end of the extruder screw, and a transition section positioned between the feed section 100 and the metering section.

Solid elastomeric material is introduced into a feed opening 108 of the barrel through the hopper or guarding section during operation of the extruder machine. The solid elastomeric material is carried by a feed roll 112 into the extruder screw 106 where it is advanced into the transition section. The solid elastomeric material is converted into a molten state as it is advanced along the transition section and is then fed into the metering section. The metering section then conveys the molten material out of the extruder usually through a shaping die mounted on the outlet end of the barrel.

Extruder machines typically employ a conventional rotating, driven, auxiliary feed roll 112 to facilitate the feed of the elastomeric material from the feed opening 108 into the extruder screw 106 in the feed section 100. The elastomeric material is very stiff and viscous when introduced through the feed opening 108 of the feed section 100 and tends to roll on top of the extruder screw 106 and does not become engaged between flights of the extruder screw 106 without the aid of the conventional feed roll 112. The conventional feed roll 112 rotates in a direction counter to the rotation of the extruder screw 106 and creates a roll nip that pinches and impinges the elastomeric material into the extruder screw 106. The extruder screw 106 then conveys the elastomeric material to the transition zone (not shown).

FIG. 2 illustrates a conventional feed roll assembly. The conventional feed roll assembly 200 includes a drive shaft end 202 of a feed roll 204 that is connected to a gear reducer and rotates the feed roll 204 during operation. The feed roll 204 includes a free end 206. The drive shaft end 202 and the free end 206 of the feed roll 204 are coupled to support arms 208 of a feed roll support 210. The use of the conventional feed roll assembly 200 is problematic because of the danger of the elastomeric material being forced into leakage paths L surrounding the feed roll 204 due to pressures generated in the feed section. Such leakage paths L include a clearance between support arms 208 and the feed roll 204, a clearance above and a clearance below the feed roll support 210 and the feed roll 204, and a clearance between the feed roll support 210 and the feed roll 204 (also see L in FIG. 1). If the feed roll 204 is not thoroughly and regularly cleaned during interruption in the operation of the extruder, then the elastomeric material located in the leakage paths L hardens and blocks the feed roll 204 when operation of the extruder is resumed. The leaked elastomeric material becomes scrap or waste and is a lost revenue that creates additional clean-up and maintenance of the extruder machine. The leaked elastomeric material also generates extensive wear on the extruder machine and causes the machine to wear more rapidly.

Attempts to reduce the leakage paths surrounding conventional feed rolls are known in the art. One such attempt proffers the use of two separable, rotating seal rings and a feed roll housing. Each rotating seal ring is fastened to an end of the feed roll and rotates with the feed roll. Each seal ring encompasses the entire end portions of the feed roll. The seal rings contain grooves for returning leaked elastomeric material to the active face of the feed roll during operation of the extruder machine. This design also encloses approximately fifty percent of the feed roll with a feed roll housing. The feed roll housing has a single, constant bore diameter. This design, however, fails to provide an efficient leakage-free feed roll assembly. While this design does enclose the feed roll, it fails to redirect the elastomeric material towards the center of the active face of the feed roll and away from the feed roll end seals.

There is a need in the industry for a feed roll assembly design that provides desirable feedback of overflow elastomeric material and permits a retrofitting of the feed roll assembly to existing extruder machines.

BRIEF SUMMARY OF THE INVENTION

The invention includes a feed roll assembly for an extruder machine. The feed roll assembly has a feed roll including a drive shaft end, a middle roll portion, and a free end. The feed roll assembly also has a shell housing comprising at least two shell housing portions, wherein the shell housing shields at least fifty percent of the middle roll portion of the feed roll.

A plurality of seal plates are located adjacent to an outer face of each shell housing portion. A seal plate bore is located in each seal plate.

At least one groove is located on an inner circumference of the seal plate bore of each seal plate.

A plurality of end plates are located adjacent to an outer face of each seal plate.

At least one groove is located on an inner face of each end plate.

An end plate bore is in each end plate.

The invention relates to a feed roll assembly for reducing a leakage of elastomeric material in a feed section of an extruder machine. A shell, feed roll seal plates, and feed roll end plates are used to reduce the leakage of elastomeric material. The shell can include a varying bore diameter that aids in the redirection of elastomeric material back into the center of the active face of the feed section and away from the end seals. The feed roll seal plates and the feed roll end plates each contain one or more grooves that aid in the redirection of the elastomeric material back into the feed section The shell, feed roll seal plates, feed roll end plates, and a feed roll scraper can each be coated with a solid, dry lubricant coating to reduce friction. The invention provides desirable feedback of overflow elastomeric material and permits a retrofitting of the feed roll assembly to existing extruder machines.

DETAILED DESCRIPTION OF THE INVENTION

The invention relates to a feed roll assembly for reducing a leakage of elastomeric material in a feed section of an extruder machine. A shell, feed roll seal plates, and feed roll end plates are used to reduce the leakage of elastomeric material. Elastomeric material is redirected back to the feed section through the use of a varying bore diameter of the shell and grooves contained in both the feed roll seal plates and the feed roll end plates. The shell, feed roll seal plates, feed roll end plates, and a feed roll scraper are each coated with a solid, dry lubricant coating to reduce friction. The invention provides desirable feedback of overflow elastomeric material and permits a retrofitting of the feed roll assembly to existing extruder machines.

This invention provides a feed roll assembly that encapsulates a portion of a feed roll with a shell or a shroud while still exposing a portion of the active face of the feed roll to a feed opening portion where an elastomeric material is introduced into a feed section of an extruder machine so that the elastomeric material is conveyed by the feed roll towards an extruder screw. This invention also provides seal plates that surround a portion of the circumference of the feed roll and end plates that cover the entire end of the feed roll. Any elastomeric material attempting to exit through the tight clearances provided by this invention is pumped back into the active flow path of the feed opening. The seal plates and the end plates each contain grooves which aid in pumping elastomeric material back into the flow path of the feed opening. The shell or shroud includes a bore with a varying diametric clearance which also aids in pumping the elastomeric material back into the flow path of the feed opening. The shell, seal plates, end plates, and a feed roll scraper are each coated with a solid, dry lubricant to reduce friction between the sealing surfaces and the elastomeric material. The feed roll assembly can be easily retrofitted to extruder machines employing conventional feed rolls. This encapsulation of the feed roll and active redirection of the elastomeric material back into the flow path of the feed opening eliminates the problem of leaked elastomeric material from becoming scrap or waste, a lost revenue that creates additional clean-up and maintenance of the extruder machine, and the cause of rapid wear on the extruder machine.

Figure 1:
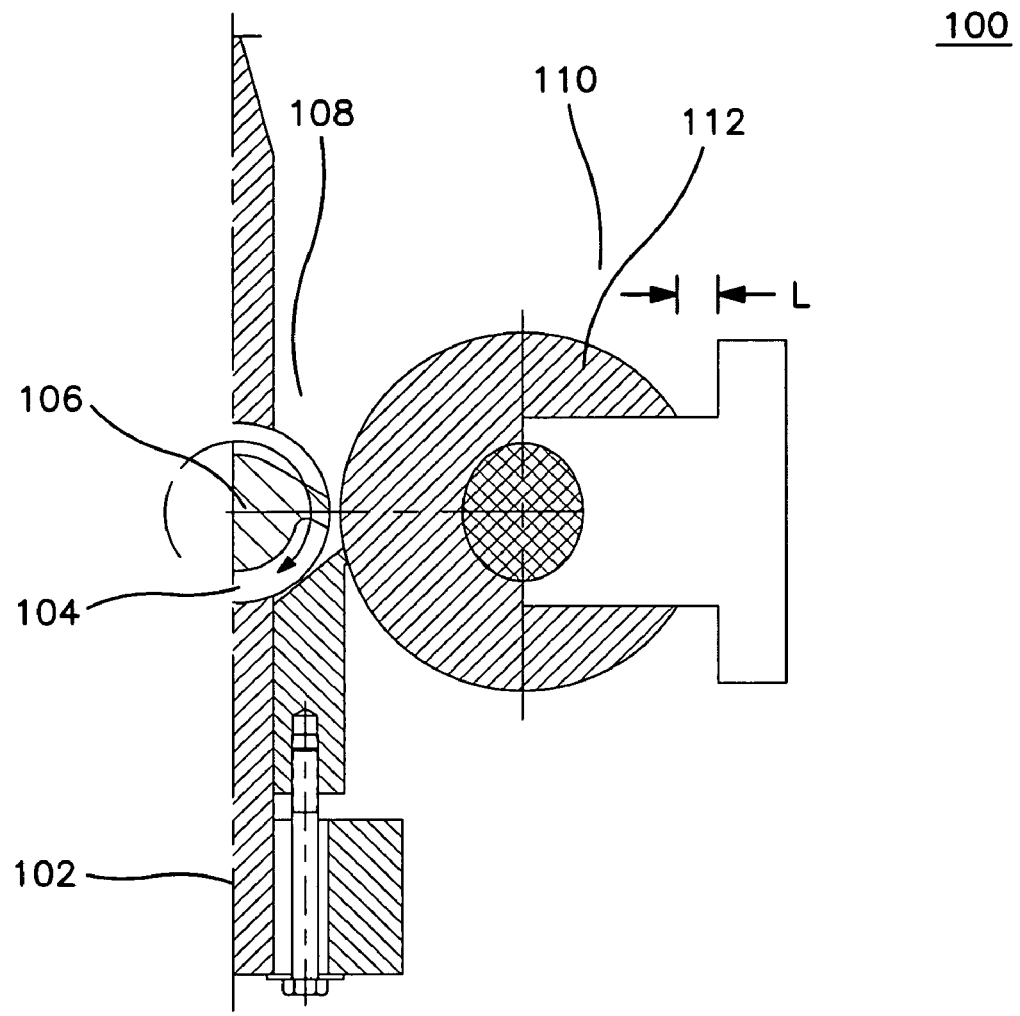
FIG. 1 illustrates a conventional feed roll assembly in a feed section of an extruder machine.
Figure 2:
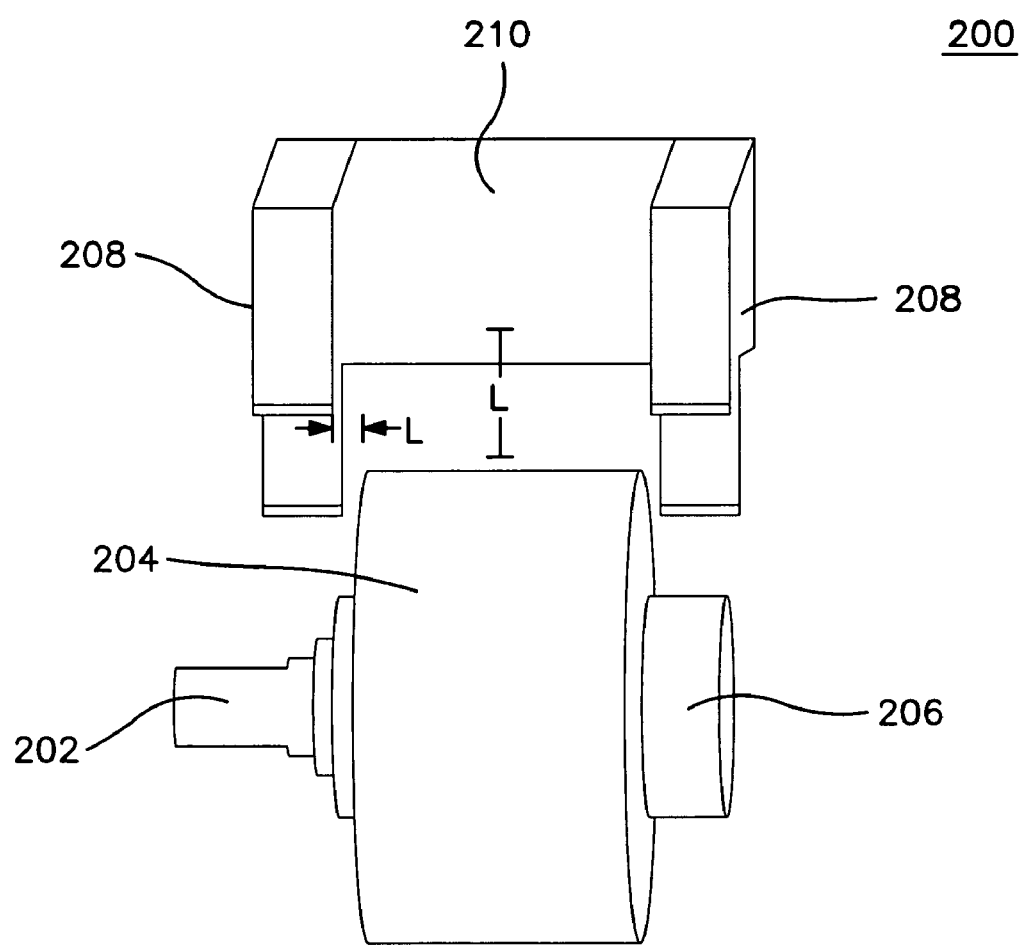
FIG. 2 illustrates a conventional feed roll assembly.
Figure 3:
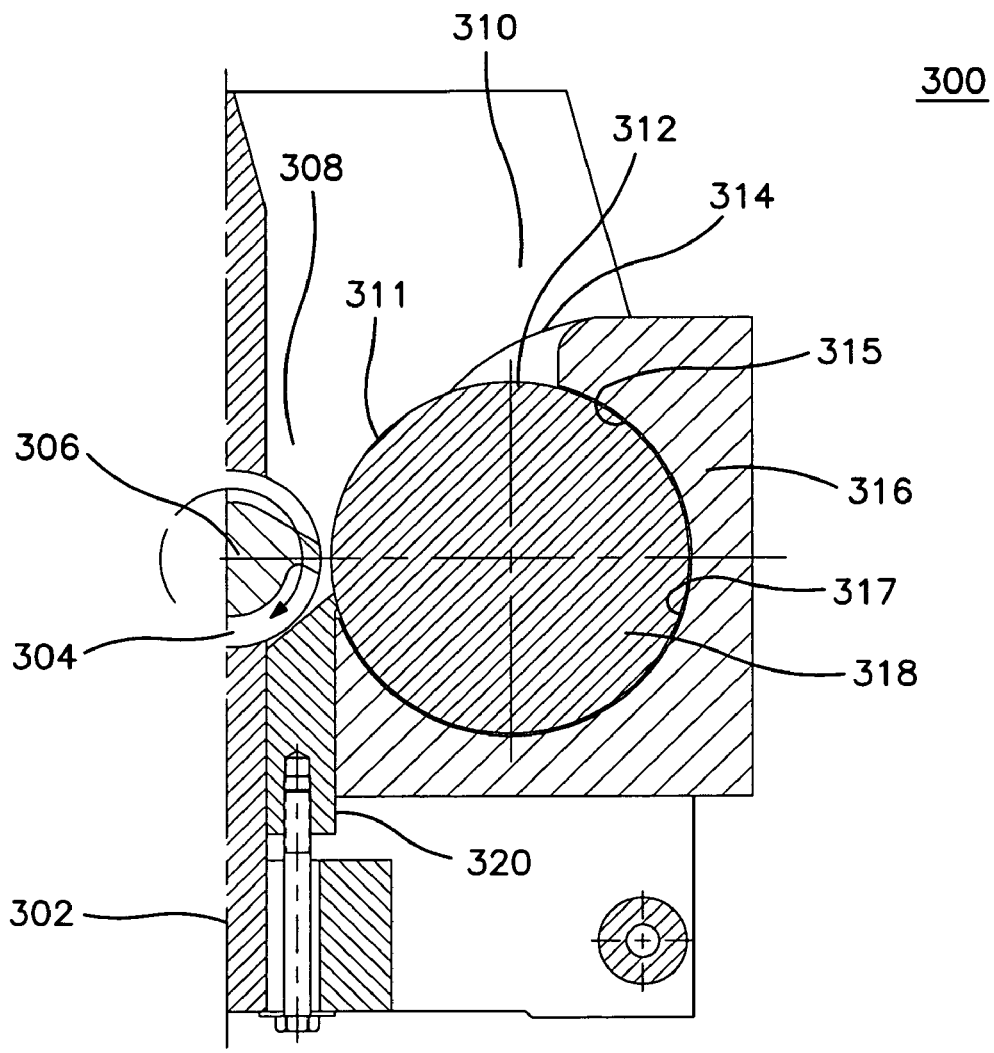
FIG. 3 illustrates a feed roll assembly in a feed section of an extruder machine in accordance with the invention.

FIG. 3 illustrates a feed roll assembly in a feed section of an extruder machine in accordance with the invention. A feed section 300 of the extruder machine is encased in a housing 302 that includes a barrel (not shown) having a bore 304. The feed section 300 is generally mounted to a gear reducer and includes a hopper or other guarding section adjacent thereto. An axially elongated extruder screw 306 is positioned within the bore 304 and is rotatably coupled to the gear reducer. The extruder screw 306 is divided into three zones or sections, a feed section 300 located at an inlet end of the extruder screw 306, a metering section located at an outlet end of the extruder screw 306, and a transition section positioned between the feed section 300 and the metering section.

Solid elastomeric material is introduced into a feed opening 308 of the barrel through the hopper or guarding section into a feed roll assembly 310 during operation of the extruder machine. The solid elastomeric material is carried from the feed roll assembly 310 by a feed roll 312 to the extruder screw 306 where it is advanced into the transition section. The solid elastomeric material is converted into a molten state as it is advanced along the transition section and is then fed into the metering section. The metering section conveys the molten material out of the extruder usually through a shaping die mounted on the outlet end of the barrel.

The feed roll assembly 310 includes stationary roll seal plates 314 that are coupled to each end of the feed roll 312. The stationary roll seal plates 314 encompass at least seventy-five percent of the drive shaft end and free end of the feed roll 312. A shell 316 shields at least fifty percent of the feed roll 312. Roll end plates 318 are coupled to the outside face of the stationary roll seal plate 314. A scraper 320 is positioned underneath the feed roll 312. The stationary roll seal plates 314 and the roll end plates 318 contain spiral seal grooves that collect elastomeric material that enters tight clearance gaps between the rotating feed roll 312 and the stationary seal plates 314. The seal grooves of the stationary roll seal plates 314 and the roll end plates 318 redirect the elastomeric material back to an active face 311 of the feed roll 312 by means of the relative motion of the surface of the feed roll 312 to the stationary roll seal plates 314 and the roll end plates 318.

The feed roll 312 is partially enclosed by the shell 316. The shell 316 shields at least fifty percent of the feed roll 312 and collects slivers of elastomeric material that fall from the feeding surface of the feed roll 312. The clearance between the shell 316 and the feed roll 312 increases from the ends towards the center of the active face 311. This increasing clearance directs the elastomeric material toward the center of the active face 311 of the feed roll 312 and back into the feed stream. An inside of a bore 317 of the shell 316 is coated with a friction reducing coating to prevent elastomeric material from sticking to the shell 316.

The roll seal plates 314 surround approximately seventy-five percent of the circumference of the ends of the feed roll 312. The shell 316 surrounds slightly less of the circumference of the remainder of the feed roll 312 than the roll seal plates 314. The roll end plates 318 fit closely to the end of the feed roll 312. The spiral seal grooves on the roll seal plates 314 and the roll end plates 318 capture and redirect elastomeric material attempting to enter the gap clearances between the roll seal plates 314 and the roll end plates 318. A non-stick coating is applied to the surfaces of the roll seal plates 314 and the roll end plates 318 to reduce friction with the elastomeric material. The bore 315 of the roll seal plates 314 is smaller than the bore 317 of the outer ends of the shell 316.

The shell 316 contains an increasing bore diameter that creates a varying clearance with the feed roll 312 to redirect the elastomer material toward the center of the active face 311 of the feed roll 312.

Figure 4:
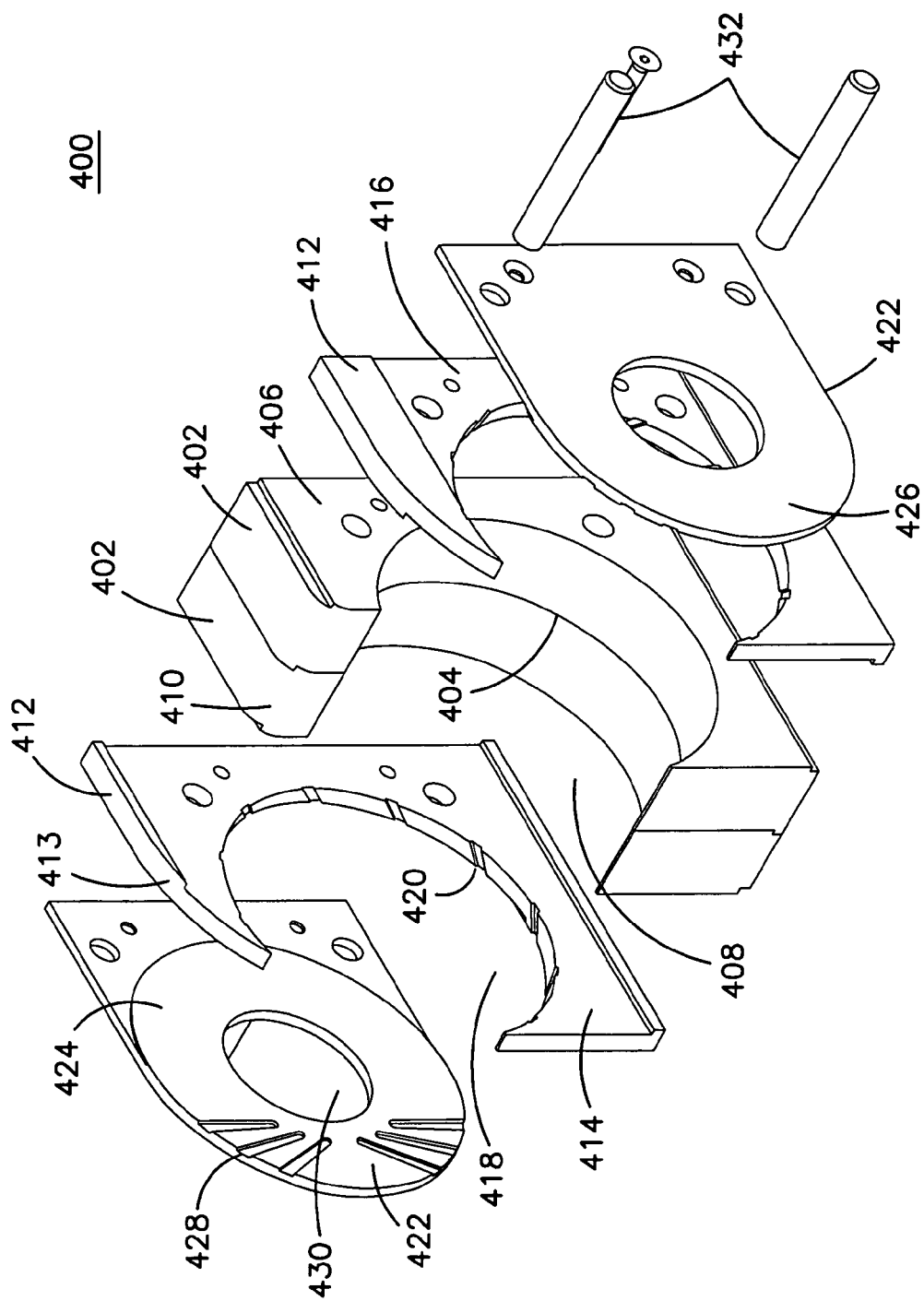
FIG. 4 illustrates a feed roll assembly in accordance with the invention.

FIG. 4 illustrates a feed roll assembly in accordance with the invention. A feed roll assembly 400 includes shell portions 402 which shield at least fifty percent of the feed roll. Each shell portion 402 includes an inner face 404 of the shell portion 402 and an outer face 406 of the shell portion 402. Each shell portion 402 also contains a shell bore 408 that varies in diameter to provide a varying clearance with the feed roll to redirect the elastomer material from the outer ends of the shell bore 408 towards the center of the active face of the feed roll. The elastomeric material is fed from the hopper through the feed opening over a top portion 410 of the shell 402. The top portion 410 of the shell 402 curves downwardly towards the feed roll to facilitate the flow of the elastomeric material. The top portion 410 and the shell bore 408 of the shell 402 are coated with a solid, dry lubricant coating to facilitate the flow of elastomeric material.

Stationary roll seal plates 412 are coupled to the outer face 406 of the shell portions 402. The roll seal plates 412 cover at least seventy-five percent of the circumference of the ends of the feed roll. Each roll seal plate 412 includes an inner face 414 and an outer face 416. A top portion 413 of each roll seal plate 412 extends beyond a length of the top portion 410 of each shell portion 402 and tapers downwardly towards the feed roll. Each roll seal plate 412 also includes a seal plate bore 418 which is smaller in diameter than the shell bore 408. Spiral seal plate grooves 420 are provided on the surface of the seal plate bore 418. The spiral seal plate grooves 420 aid in redirecting the elastomer material towards the center of the active face portion of the feed roll. The inner face 414 of the roll seal plates 412, the seal plate bore 418, and the spiral seal plate grooves 420 are coated with a solid, dry lubricant coating to facilitate the flow of the elastomeric material.

Stationary roll end plates 422 are coupled to the outer face 416 of each roll seal plate 412. Each roll end plate 422 has an inner face 424 and an outer face 426. Spiral end plate grooves 428 are provided on the inner face 424 of each roll end plate 422. The spiral end plate grooves 428 aid in redirecting the elastomer material towards the seal grooves 420, which then redirect the elastomer material towards the center of the active face portion of the feed roll. The roll end plates 422 also contain an end plate bore 430. The end plate bore 430 is smaller in diameter than the seal plate bore 418 and fits closely to the end of the feed roll. The inner face 424 of the roll end plates 422, the end plate grooves 428, and the end plate bore 430 are coated with a solid, dry lubricant coating to facilitate the flow of elastomeric material. Fasteners 432 are provided for fastening the feed roll assembly 400.

Figure 5A:
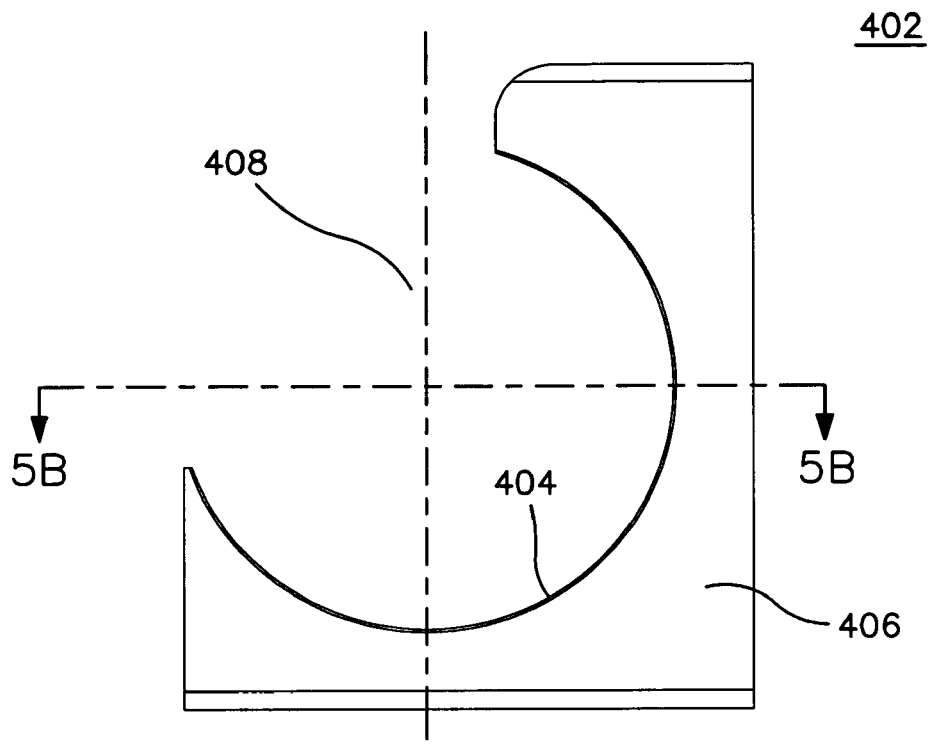
FIG. 5 illustrates (a) a side view and (b) a cross-section view of the shell housing portion 414(b) of the feed roll assembly as illustrated in FIG. 4.
Figure 5B:
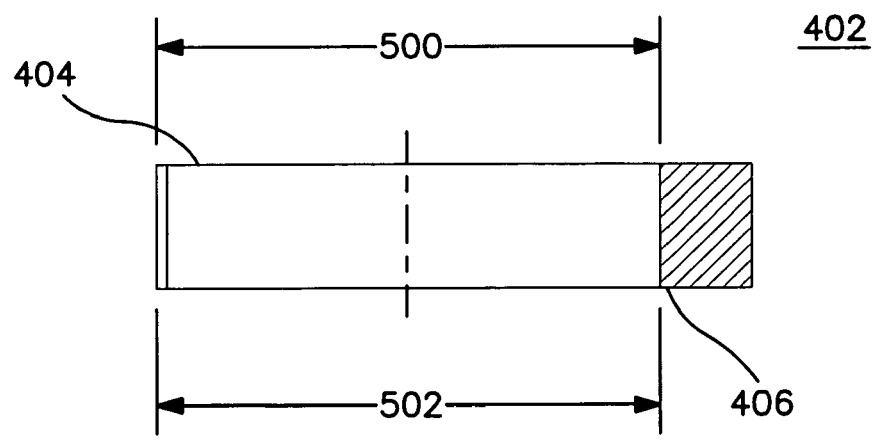

FIG. 5(a) illustrates a side view and FIG. 5(b) illustrates a cross-section view of a shell housing 402 of the feed roll assembly as illustrated in FIG. 4. The shell bore 408 of each shell housing 402 varies in diameter from the inner face 404 to the outer face 406 of each shell housing 402. The shell bore 408 comprises an inner diameter 500 and an outer diameter 502 as illustrated in FIG. 5(b). The shell bore 408 gradually increases in diameter from the inner diameter 500 to the outer diameter 502 to provide a varying clearance with the feed roll. This varying clearance aids in the redirection of the elastomer material from the outside ends of the shell bore 408 to the center of the active face portion of the feed roll.

In view of the many changes and modification that can be made without departing from principles underlying the invention, reference should be made to the appended claims for an understanding of the scope of the protection to be afforded the invention.

What is claimed is:

1. A feed roll assembly for an extruder machine comprising:
 a feed roll comprising a drive shaft end, a middle roll portion, and a free end;
 a shell housing comprising at least two shell housing portions, wherein the shell housing shields at least fifty percent of the middle roll portion of the feed roll and comprises a varying inner diameter to provide varying clearance with the feed roll;
 a plurality of seal plates located adjacent to an outer face of each shell housing portion;
 a seal plate bore in each seal plate;
 a plurality of spiral grooves located on an inner circumference of the seal plate bore of each seal plate;
 a plurality of end plates located adjacent to an outer face of each seal plate;
 a plurality of spiral grooves located on an inner face of each end plate; and
 an end plate bore in each end plate.

2. The feed roll assembly of claim 1, wherein each spiral groove located in each roll end plate has a constant width.

3. The feed roll assembly of claim 1, wherein each spiral groove located in each seal plate has a constant width.

4. The feed roll assembly of claim 1, wherein:
 the shell housing has two shell housing portions;
 one of two seal plates is located adjacent the outer face of each of the shell housing portions, each seal plate has a plurality of spiral grooves; and
 one of two end plates are located adjacent to the outer face of each seal plate, each end plate has a plurality of spiral grooves.

5. The feed roll assembly of claim 4, wherein each shell housing portion comprises a varying inner diameter to provide varying clearance with the feed roll.

6. The feed roll assembly of claim 5, wherein each spiral groove located in each roll end plate has a constant width.

7. The feed roll assembly of claim 5, wherein each spiral groove located in each seal plate has a constant width.

8. The feed roll assembly of claim 6, wherein each spiral groove located in each seal plate has a constant width.

9. The feed roll assembly of claim 1, wherein at least one spiral groove of the seal plates and at least one spiral groove of the end plates structurally cooperate to redirect elastomeric material back towards the middle roll portion of the feed roll during operation of the feed roll assembly.

10. The feed roll assembly of claim 8, wherein the spiral grooves of the seal plates and the spiral grooves of the end plates structurally cooperate to redirect elastomeric material back towards the middle roll portion of the feed roll during operation of the feed roll assembly.

* * * * *